(12) United States Patent
Lee (10) Patent No.: US 8,311,385 B2
(45) Date of Patent: Nov. 13, 2012

(54) METHOD AND DEVICE FOR CONTROLLING VIDEO RECORDATION PROPERTY OF CAMERA MODULE ACCORDING TO VELOCITY OF OBJECT

(75) Inventor: Hye-Ran Lee, Seoul (KR)

(73) Assignee: MtekVision Co., Ltd., Seoul (KR)

( * ) Notice: Subject to any disclaimer, the term of this patent is extended or adjusted under 35 U.S.C. 154(b) by 247 days.

(21) Appl. No.: 12/908,139

(22) Filed: Oct. 20, 2010

(65) Prior Publication Data

US 2011/0280541 A1 Nov. 17, 2011

(30) Foreign Application Priority Data

May 12, 2010 (KR) .......................... 10-2010-0044295

(51) Int. Cl.
*H04N 5/77* (2006.01)
(52) U.S. Cl. .................... 386/226; 348/208.16
(58) Field of Classification Search .................. 386/224, 386/226; 348/208.16
See application file for complete search history.

(56) References Cited

U.S. PATENT DOCUMENTS

| 2007/0092244 | A1* | 4/2007 | Pertsel et al. ................. 396/153 |
| 2007/0189728 | A1* | 8/2007 | Yu ................................. 386/107 |
| 2010/0265344 | A1* | 10/2010 | Velarde et al. ............ 348/208.16 |

FOREIGN PATENT DOCUMENTS

| KR | 10-2005-0077149 A | 1/2004 |
| KR | 10-2007-0066651 A | 6/2007 |

* cited by examiner

*Primary Examiner* — Thai Tran
*Assistant Examiner* — William Tran
(74) *Attorney, Agent, or Firm* — Birch, Stewart, Kolasch & Birch, LLP (57) ABSTRACT

Method and device for controlling a video recording attribute such as a frame rate and/or an exposure value to suitably record a video depending on a velocity of an object detected by a camera module are provided. The device for controlling a video recording attribute of a camera module includes: a video input unit that receives video data corresponding to frames from the camera module; a motion information acquiring unit that acquires motion information between two successive frames; a video recording attribute determining unit that determines the video recording attribute of the camera module on the basis of the motion information; and a camera module controller that generates a camera module control signal for causing the camera module to perform a video recording operation on the basis of the determined video recording attribute and outputs the camera module control signal to the camera module. Accordingly, it is possible to enhance the processability of an object moving at a high velocity in a surveillance area to accurately detect the object by controlling a video recording attribute (a frame rate and/or an exposure value) of a camera module depending on the velocity of the object moving in the surveillance area.

3 Claims, 6 Drawing Sheets

METHOD AND DEVICE FOR CONTROLLING VIDEO RECORDATION PROPERTY OF CAMERA MODULE ACCORDING TO VELOCITY OF OBJECT

CROSS REFERENCE

This application is based on and claims priority under 35USC 119 from Korean Patent Application No. 10-2010-0044295, filed on May 12, 2010.

BACKGROUND

1. Field of the Invention

The presenting invention relates to method and device for controlling a video recording attribute such as a frame rate and/or an exposure value to suitably record a video depending on a velocity of an object detected by a camera module.

2. Description of the Related Art

In general, a surveillance camera has to record a video for a considerable long time and thus requires a data storage space for storing a lot of data. However, since the storage space cannot be infinitely extended due to restrictions in cost, space, and the like, it is necessary to compress a video as much as possible so as to store the video in a definite storage space and thus to control a compression rate or a frame rate so as to maintain the performance of the surveillance camera.

The frame rate at which a human being can recognize a natural motion is about 30 fps (frame per second). Accordingly, in the past, the surveillance camera was set to perform a video recording operation only at a constant frame rate (for example, 30 fps).

However, the video recorded by the surveillance camera may include only a stationary background in which no variation exists in a surveillance area or may include an object moving at various velocities. That is, the object existing in the video recorded by the surveillance camera may move at various velocities.

In the surveillance camera recording a video only at a constant frame rate, when an object moving at a low velocity exists or no moving object exists in the surveillance area, a lot of video data are generated unnecessarily to waste the storage space. When an object moving at a high velocity and not being accurately photographed at the constant frame rate exists in the surveillance area, it is not possible to accurately record the object and thus to properly exhibit the performance as a surveillance camera.

SUMMARY

An advantage of some aspects of the invention is that it provides method and device for controlling a video recording attribute of a camera module, which can enhance the processability of an object moving at a high velocity in a surveillance area to accurately detect the object by controlling a video recording attribute (a frame rate and/or an exposure value) of a camera module depending on the velocity of the object moving in the surveillance area.

Another advantage of some aspects of the invention is that it provides method and device for controlling a video recording attribute of a camera module, which can reduce an amount of data to be recorded to efficiently use a defined storage space by controlling a video recording attribute (a frame rate and/or an exposure value) of a camera module depending on the velocity of an object moving in the surveillance area.

According to an aspect of the invention, there is provided a device for controlling a video recording attribute of a camera module, including: a video input unit that receives video data corresponding to frames from the camera module; a motion information acquiring unit that acquires motion information between two successive frames; a video recording attribute determining unit that determines the video recording attribute of the camera module on the basis of the motion information; and a camera module controller that generates a camera module control signal for causing the camera module to perform a video recording operation on the basis of the determined video recording attribute and outputs the camera module control signal to the camera module.

The motion information acquiring unit may include: a block selecting section that selects one of a plurality of candidate blocks, into which the later frame of the two successive frames is divided so as not to overlap with each other, as a reference block; a search range setting section that sets a search range on the basis of the position of the reference block in the previous frame; a block comparison value calculating section that calculates a block comparison value between pixel values in a comparison block moving by pixels in the search range and pixels values in the reference block; and a motion vector acquiring section that acquires a block motion vector from the position of the comparison position and the position of the reference block, which makes the block comparison value the minimum. Here, the motion information acquiring unit further includes a motion ratio calculating section that calculates a motion ratio by normalizing the magnitude of the block motion vector with predetermined maximum value and minimum value.

The plurality of candidate blocks may be sequentially or non-sequentially selected as the reference block, and the motion vector acquiring section may determine a frame motion vector of the later frame on the basis of the block motion vectors acquired to correspond to the plurality of candidate blocks, respectively. Here, the motion information acquiring unit may further include a motion ratio calculating section that calculates a motion ratio by normalizing the magnitude of the block motion vector with predetermined maximum value and minimum value.

The video recording attribute may include a frame rate of the camera module, and the video recording attribute determining unit may determine as the frame rate a value obtained by multiplying a predetermined maximum value of the frame rate by the motion ratio.

Alternatively, the video recording attribute may include an exposure value of the camera module, and the video recording attribute determining unit may determine as the exposure value EXPprop obtained by Expression, EXPprop=(1−Vnor)×(EXPmax−EXPmin)+EXPmin, here Vnor represents the motion ratio, EXPmax represents the predetermined maximum value of the exposure value, and EXPmin represents the predetermined minimum value of the exposure value.

Alternatively, the video recording attribute may include a frame rate and an exposure value of the camera module, and the video recording attribute determining unit may determine as the frame rate a value obtained by multiplying a predetermined maximum value of the frame rate by the motion ratio and may determine as the exposure value EXPprop obtained by Expression, EXPprop=(1−Vnor)×(EXPmax−EXPmin)+EXPmin, here Vnor represents the motion ratio, EXPmax represents the predetermined maximum value of the exposure value, and EXPmin represents the predetermined minimum value of the exposure value.

According to another aspect of the invention, there are provided a method of controlling a video recording attribute of a camera module in a video recording attribute controlling device and a recording medium having recorded thereon a program for carrying out the method.

The method of controlling a video recording attribute of a camera module includes steps of (a) acquiring motion information of two successive frames when video data corresponding to a plurality of frames are input from the camera module; (b) determining a video recording attribute of the camera module on the basis of the motion information; and (c) generating a camera module control signal for causing the camera module to perform a recording operation on the basis of the determined video recording attribute and outputting the generate camera module control signal to the camera module.

The step of (a) may include steps of (a1) selecting one of a plurality of candidate blocks, into which the later frame of the two successive frames is divided so as not to overlap with each other, as a reference block; (a2) setting a search range on the basis of the position of the reference block in the previous frame; (a3) calculating a block comparison value between pixel values in a comparison block moving by pixels in the search range and pixel values in the reference block; and (a4) acquiring a block motion vector from the position of the comparison position and the position of the reference block, which make the block comparison value the minimum. The step of (a) may further include a step of calculating a motion ratio by normalizing the magnitude of the block motion vector with predetermined maximum value and minimum value.

The step of (a) may further include a step of determining a frame motion vector of the later frame on the basis of the block motion vectors acquired by repeatedly performing the steps of (a1) to (a4) when the plurality of candidate blocks into which the later frame is divided are sequentially or non-sequentially selected as the reference block. The step of (a) may further include a step of calculating a motion ratio by normalizing the magnitude of the block motion vector with predetermined maximum value and minimum value.

The video recording attribute may include a frame rate of the camera module, and the step of (b) may include a step of determining as the frame rate a value obtained by multiplying a predetermined maximum value of the frame rate by the motion ratio.

Alternatively, the video recording attribute may include an exposure value of the camera module, and the step of (b) may include a step of determining as the exposure value EXPprop obtained by Expression, $EXPprop = (1-Vnor) \times (EXPmax - EXPmin) + EXPmin$, where Vnor represents the motion ratio, EXPmax represents the predetermined maximum value of the exposure value, and EXPmin represents the predetermined minimum value of the exposure value.

Alternatively, the video recording attribute may include a frame rate and an exposure value of the camera module, and the step of (b) may include a step of determining as the frame rate a value obtained by multiplying a predetermined maximum value of the frame rate by the motion ratio and determining as the exposure value EXPprop obtained by Expression, $EXPprop = (1-Vnor) \times (EXPmax - EXPmin) + EXPmin$, where Vnor represents the motion ratio, EXPmax represents the predetermined maximum value of the exposure value, and EXPmin represents the predetermined minimum value of the exposure value.

Other aspects, features, and advantages will become apparent from the accompanying drawings, the appended claims, and the detailed description.

According to the above-mentioned configuration, it is possible to enhance the processability of an object moving at a high velocity in a surveillance area to accurately detect the object by controlling a video recording attribute (a frame rate and/or an exposure value) of a camera module depending on the velocity of the object moving in the surveillance area.

It is also possible to reduce an amount of data to be recorded to efficiently use a defined storage space by controlling a video recording attribute (a frame rate and/or an exposure value) of a camera module depending on the velocity of an object moving in the surveillance area.

DESCRIPTION OF EXEMPLARY EMBODIMENTS

The invention can be variously modified in various forms and specific embodiments will be described and shown in the drawings. However, the embodiments are not intended to limit the invention, but it should be understood that the invention includes all the modifications, equivalents, and replacements belonging to the spirit and the technical scope of the invention. When it is determined that detailed description of known techniques involved in the invention makes the gist of the invention obscure, the detailed description will not be made.

Terms such as "first" and "second" can be used to describe various elements, but the elements are not limited to the terms. The terms are used only to distinguish one element from another element.

The terms used in the following description are used to merely describe specific embodiments, but are not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Terms, "unit", "module", and the like, described in the specification mean a unit for performing at least one function or operation and can be embodied by hardware, by software, or by a combination of hardware and software.

When it is determined that detailed description of known techniques involved in the invention unnecessarily makes the gist of the invention obscure, the detailed description will not be made.

Hereinafter, exemplary embodiments of the invention will be described in detail with reference to the accompanying drawings.

Figure 1:
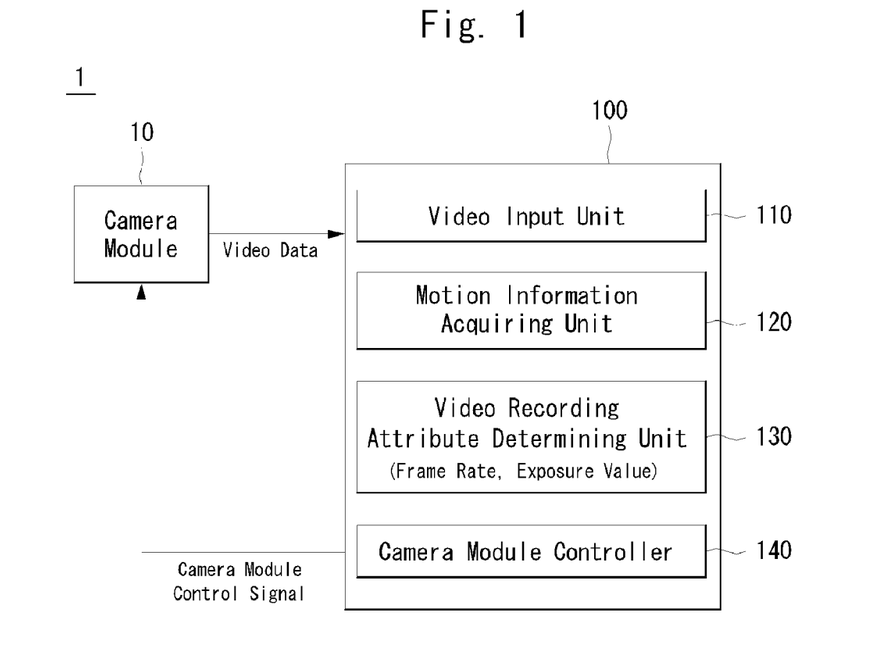
FIG. 1 is a block diagram schematically illustrating the configuration of a video recording attribute controlling device used in a surveillance camera system according to an embodiment of the invention.
Figure 2:
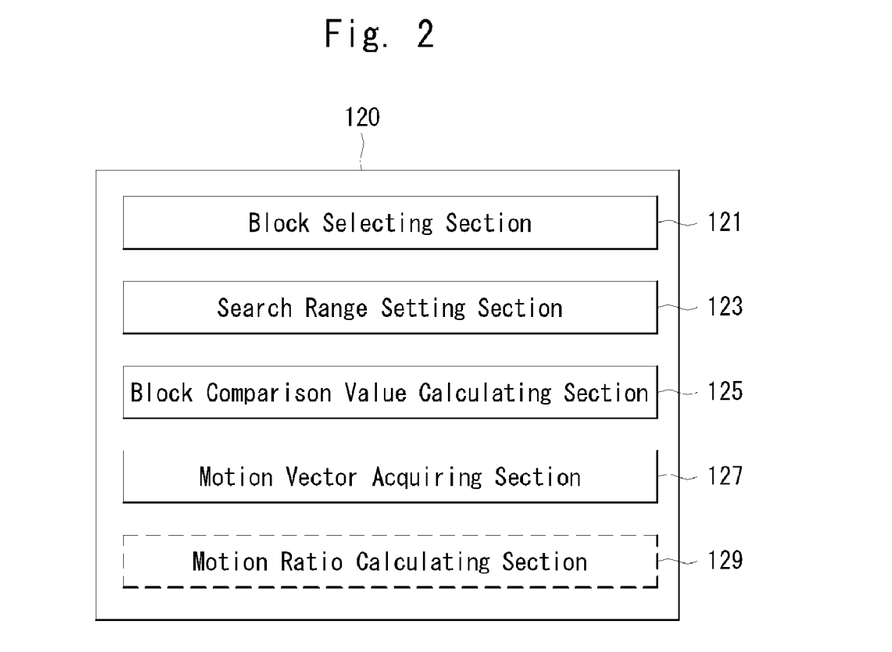
FIG. 2 is a block diagram schematically illustrating the configuration of a motion information acquiring unit in the video recording attribute controlling device according to the embodiment of the invention.
Figure 3:
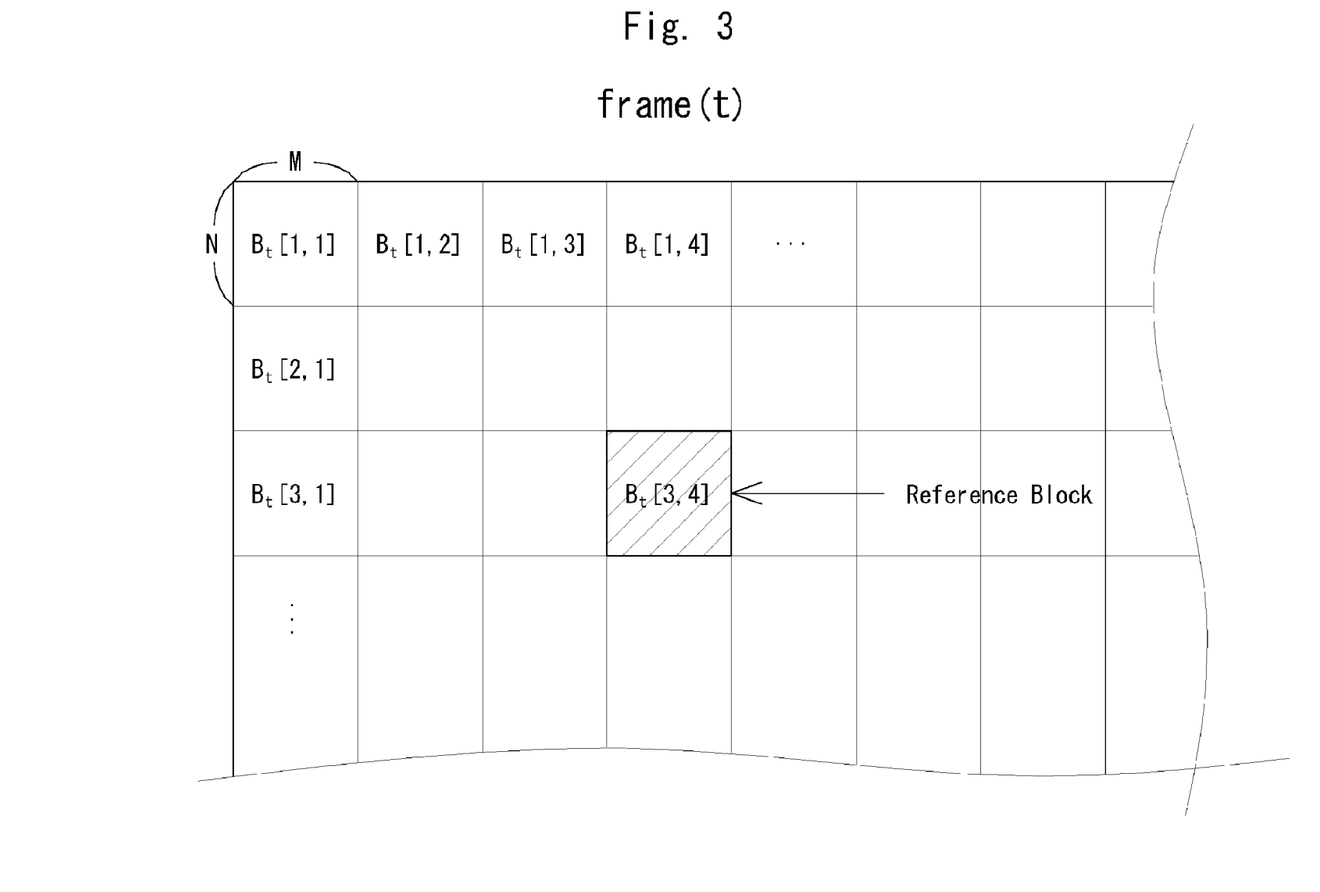
FIG. 3 is a diagram illustrating a part of a current frame divided into plural blocks.
Figure 4:
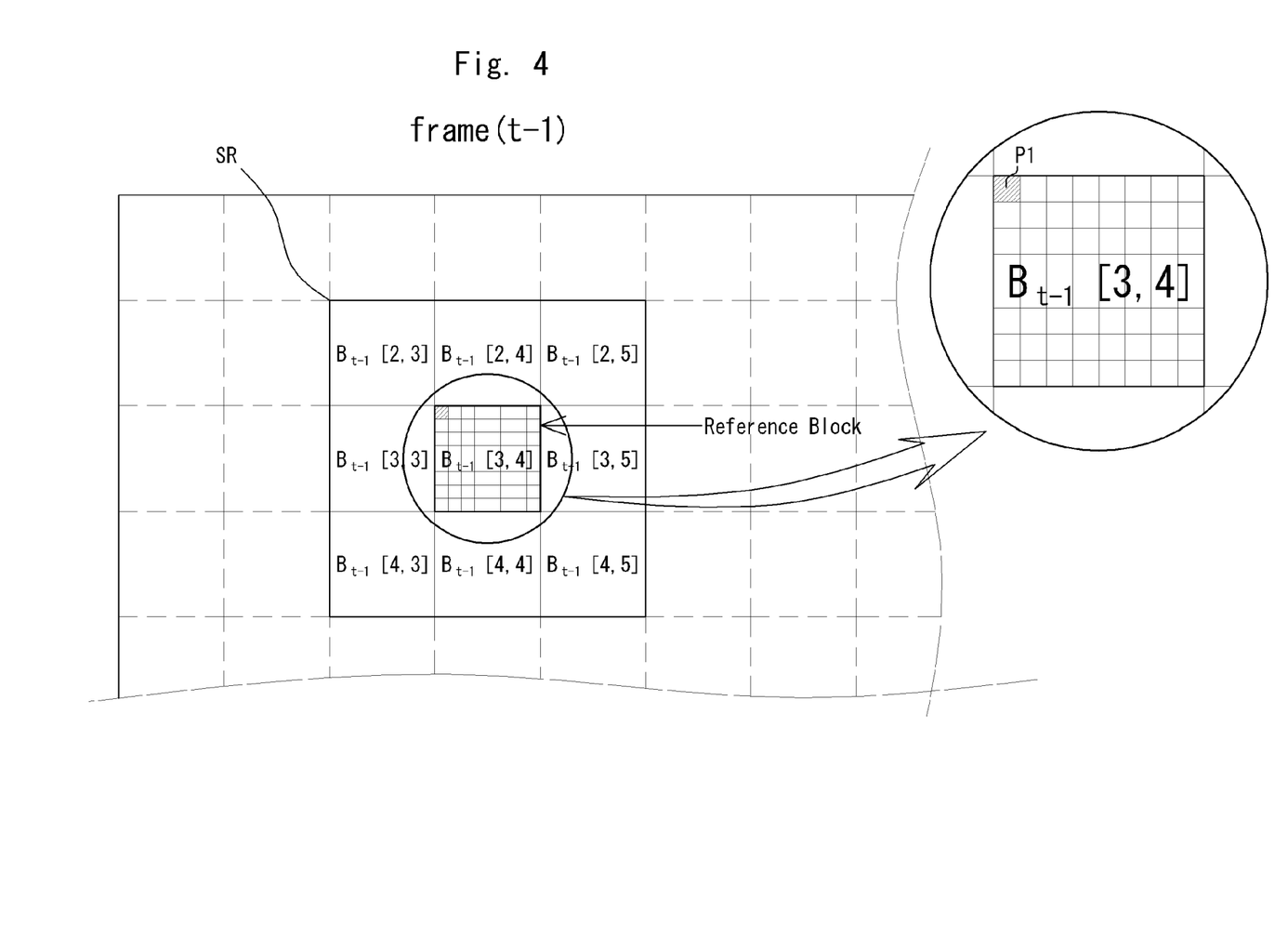
FIG. 4 is a diagram illustrating a part of a previous frame in which a search range is displayed.
Figure 5:
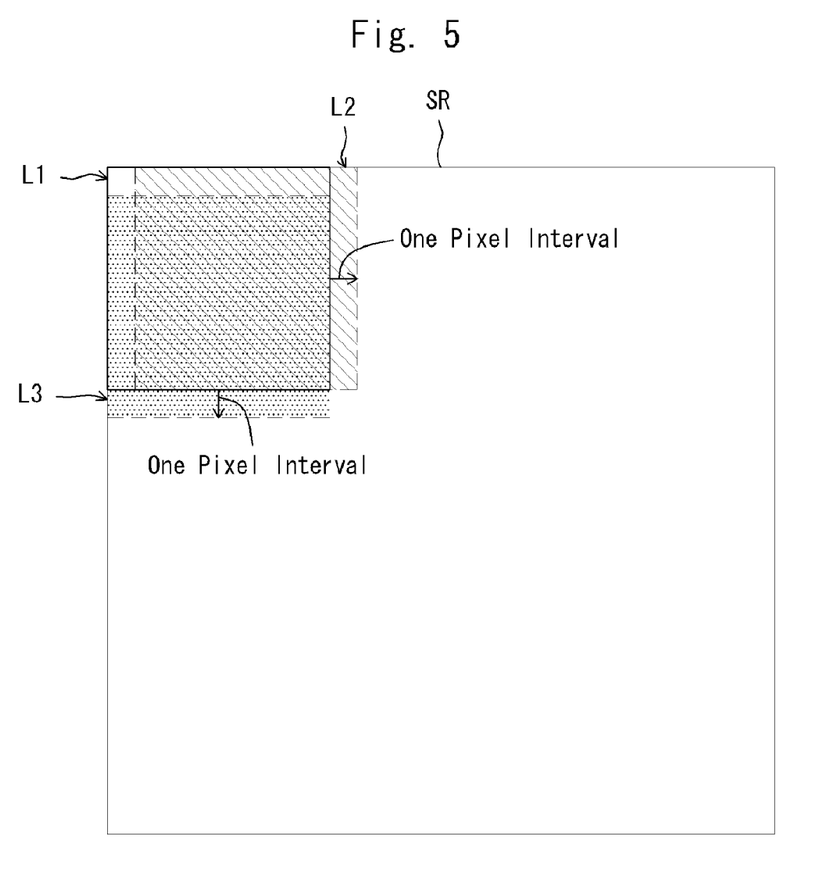
FIG. 5 is a diagram illustrating the movement of a comparison block in the search range.

FIG. 1 is a block diagram schematically illustrating the configuration of a video recording attribute controlling device used in a surveillance camera system according to an embodiment of the invention. FIG. 2 is a block diagram schematically illustrating the configuration of a motion information acquiring unit in the video recording attribute controlling device according to the embodiment of the invention. FIG. 3 is a diagram illustrating a part of a current frame divided into plural blocks. FIG. 4 is a diagram illustrating a part of a previous frame in which a search range is displayed. FIG. 5 is a diagram illustrating the movement of a comparison block in the search range.

Referring to FIG. 1, a surveillance camera system 1 according to an embodiment of the invention includes a camera module 10 and a video recording attribute controlling device 100.

The camera module 10 includes a lens and an image sensor. An optical image of a subject is transmitted to the image sensor through the lens, and the image sensor converts the optical image of the subject into an electrical signal and outputs the electrical signal as image data. The image sensor uses, for example, the characteristic of semiconductor responding to light. The image sensor includes an array of small photosensitive diodes called pixels. The pixels sense brightness and wavelengths of light emitted from different subjects, convert the sensed quantities into electrical values, and amplifies the electrical values to levels which can be processed. That is, the image sensor is a semiconductor device that converts an optical image of a subject transmitted through the lens into an electrical signal as image data.

In the image sensor, plural pixels are arranged in a two-dimensional structure with a lattice pattern and each pixel converts the intensity of incident light into an electrical signal. By measuring these electrical signals, it is possible to detect the intensities of light incident on the respective pixels and to construct an image in the unit of pixels.

The camera module 10 outputs video data having been subjected to a signal process. As elements (such as an image signal processor (ISP) and a multimedia processor) for processing the video data output from the camera module 10, elements of the surveillance camera system 1 depart from the gist of the invention and thus are not described herein.

The video data output from the camera module 10 is continuously stored in a storage space (not shown) such as a memory. The surveillance camera system 1 according to the embodiment of the invention includes a storage space storing video data corresponding to two or more frames.

The camera module 10 generates and outputs video data while changing a video recording attribute such as a frame rate and/or an exposure value on the basis of a camera module control signal supplied from a video recording attribute controlling device 100 to be described later.

Here, the frame rate as one video recording attribute is the number frames per second output from the camera module and means the number of frames which can be acquired for 1 second. When the frame rate is higher, it means that the number of frames acquired for 1 second is great, and the motion of a subject is photographed at a shorter interval, thereby capturing a fine motion of a subject moving at a high velocity. However, when the frame rate is low, it means that the time interval between frames during capturing an image is elongated, thereby making it difficult to photograph a fine motion of a subject. For example, when an object moving at a velocity of 30 km/h is imaged at a frame rate of 30 fps, the motion is natural and thus can be distinguished clearly. However, when an object moving at a velocity of 60 km/h or higher is imaged at the same frame rate, the motion of the object may not be distinguished in the acquired video. Accordingly, the video recording attribute controlling device 100 can change the frame rate depending on the velocity of the object.

The exposure value as another video recording attribute is a factor affecting the photographing of a moving object. The short exposure value means that the time of acquiring a Name is short. In this case, it is possible to photograph an object moving at a high velocity so as to clearly distinguish it. However, when the exposure value is long, the time of acquiring a frame is elongated. Accordingly, an object moving at a high velocity and moving even while acquiring a frame may be photographed with shake or unclearness. When the exposure value of receiving the same light is short, the acquire intensity of light is small and thus a dark video is acquired. Therefore, by compensating for a short exposure value with an analog gain, it is possible to maintain the brightness. The analog gain has a characteristic that noise increases in proportion to the magnitude of the gain. Accordingly, when the exposure value is short, the noise of a video generally increases greatly. Therefore, the video recording attribute controlling device 100 changes the exposure value depending on the velocity of an object.

The video recording attribute controlling device 100 according to this embodiment can determine a video recording attribute (such as a frame rate and/or an exposure value) of the camera module 10 depending on the velocity of an object detected in the video recorded by the camera module 10 and apply the determined video recording attribute to the camera module 10, thereby efficiently using a data storage space for storing video data and recording a video to distinguish a moving object.

The video recording attribute controlling device 100 according to this embodiment is connected to the camera module 10 disposed in a surveillance area through wired or wireless networks, and receives video data recorded by the camera module 10, and outputs a signal for controlling the video recording attribute (the frame rate and/or the exposure value) of the camera module 10. The video recording attribute controlling device 100 may be monolithically combined with each camera module 10 to construct an individual surveillance camera system.

Referring to FIG. 1, the video recording attribute controlling device 100 according to this embodiment includes a vide input unit 110, a motion information acquiring unit 120, a video recording attribute determining unit 130, and a camera module controller 140.

The video input unit 110 receives video data generated by the camera module 10 from the camera module 10 connected thereto in a wired or wireless manner. In this embodiment, since it is necessary to change a video recording attribute of the camera module 10 adaptively depending on the velocity of an object detected in the video which is being photographed by the camera module 10, the image input unit 110 can be set to receive video data in real time.

Here, the video data may be a moving image including plural successive frames and may have the frame rate and/or the exposure value changed by the video recording attribute controlling device 100 according to this embodiment.

The motion information acquiring unit 120 analyzes the video data input to the image input unit 110 and acquires motion information of two successive frames constituting the video data. Hereinafter, it is exemplified that two successive frames include a current frame (frame(t)) currently acquired and a previous frame (frame(t−1)) previously stored.

Referring to FIG. 2, the motion information acquiring unit 120 includes a block selecting section 121, a search range setting section 123, a block comparison value calculating section 125, and a motion vector acquiring section 127. The motion information acquiring unit 120 may further include a motion ratio calculating section 129 as needed.

The current frame (frame(t)) of the video data can be divided into plural blocks so as not to overlap with each other. The block selecting section 121 selects one of the plural blocks constituting the current frame as a reference block. All or a part of the blocks of the current frame may be sequentially or non-sequentially selected as the reference block, or a predetermined number of blocks or a block at predetermined position may be selected as the reference block.

Referring to FIG. 3, the current frame (frame(t)) which is the later frame of two successive frames includes candidate blocks with a size of M×N (where M and N are natural numbers) arranged in a lattice pattern (two-dimensional arrangement) and block $B_t[3, 4]$ of the candidate blocks is selected as the reference block. $B_t[X, Y]$ represents the position of the selected reference block in the current frame (frame(t)), that is, means a candidate block located at the X-th position in the column direction and the Y-th position in the row direction.

The search range setting section 123 sets the search range in the previous frame (frame(t−1)) on the basis of the same position as the position of reference block, which is selected by the block selecting section 121, in the current frame.

The search range can be set using various methods. In an example, the search range may be set to include nine blocks in total of four blocks located on the upper, lower, left, and right sides of the block located at the same position in the previous frame as the position of the reference block, four blocks located closest to the same position in diagonal directions, and one block located at the same position. The size of the search range and the number of candidate blocks may be set in advance experimentally and statistically or may be corrected and set by a user.

For example, regarding the reference block $B_t[3, 4]$ selected in the current frame (frame(t)) shown in FIG. 3, an area including one block $B_{t-1}[3, 4]$ located at the same position in the previous frame (frame(t−1)) as the position of the reference block, four blocks $B_{t-1}[2, 4]$, $B_{t-1}[4, 4]$, $B_{t-1}[3, 3]$, and $B_{t-1}[3, 5]$ located on the upper, lower, left, and right sides of the block located at the same position as the position of the reference block, four blocks $B_{t-1}[2, 3]$, $B_{t-1}[2, 5]$, $B_{t-1}[4, 3]$, and $B_{t-1}[4, 5]$ located closest to the same position in diagonal directions may be set as the search range SR, as shown in FIG. 4.

In another example of setting the search range, a rectangular search range may be set which has as four vertexes blocks with the same size in which pixels apart by a predetermined interval from a pixel P1 located at the top-left corner of the block located at the same position in the previous frame as the position of the reference block are located at the top-left corners thereof, respectively.

The block comparison value calculating section 125 calculates a block comparison value by comparing pixel values in the reference block with pixel values in a comparison block moving by pixels in the search range determined by the search range setting section 123. Here, the pixel values to be compared may be, for example, luminance values of the corresponding pixels.

To calculate the block comparison value, it is necessary to match the pixels of the reference block with the pixels of the comparison block one to one. Accordingly, the size of the comparison block may be equal to the size of the reference block.

The block comparison value calculating section 125 calculates the block comparison value the sum of differences in pixel value between the pixels of the comparison block and the pixels of the reference block, which correspond to each other one to one, as expressed by Expression 1.

$$\sum_{x=1}^{M}\sum_{y=1}^{N}|B_t[\text{Reference Block}](x, y) - B_{t-1}[\text{Comparison Block}](x, y)| \qquad \text{Expression 1}$$

Here, the size of the reference block and the comparison block is M×N. $B_t$[Ref. block](x,y) represents a pixel value of a pixel located at (x,y) with respect to a reference point (for example, the top-left point) in the reference block $B_t$[Ref block] of the current frame (frame(t)) and $B_{t-1}$[Com. block](x,y) represents a pixel value of a pixel located at (x,y) with respect to a reference point (for example, the top-left point) in the comparison block $B_{t-1}$[Com. block] of the previous frame (frame(t−1)).

Referring to FIG. 5, the comparison block has the same size as the reference block and moves in the search range SR by pixels.

For example, when the comparison block is located at the first position L1 (when the top-left pixel of the comparison block is located at the first row and the first column in the search range SR, a first block comparison value is calculated using Expression 1. When the comparison block is located at the second position L2 displaced by one pixel in the row direction (when the top-left pixel of the comparison block is located at the first row and the second column in the search range SR), a second block comparison value is calculated using Expression 1 again. In this way, by repeatedly performing this process while moving the comparison block by one pixel in the row direction, the block comparison values of the respective positions are calculated. When a part of the comparison block departs from the search range, the movement in the row direction is finished. That is, only when the comparison block is located within the search range, the movement is made.

When the movement in one row (the first row in FIG. 5) is finished, the comparison block is made to move to the third position L3 (the top-left pixel of the comparison block is located at the second row and the first column in the search range SR) which is the left-most in the next row (the second row in FIG. 5) in the search range SR and then the above-mentioned operation is repeatedly performed in the corresponding row.

By causing the comparison block to move by one pixel in all the rows in the search range SR, it is possible to calculate the block comparison values at the respective positions, which are the comparison results with the pixel values of the reference block. Here, when a part of the comparison block departs from the search range, the movement in the column direction is also finished. That is, only when the comparison block is located within the search range, the movement is made.

FIG. 5 exemplifies that the comparison block moves in a zigzag shape in the horizontal direction, but the comparison block may move in the "⇌" shape or in a zigzag shape in the vertical direction. The motion vector acquiring section 127 acquires a block motion vector from the position of the reference block and the position of the comparison block of which the block comparison value calculated by the block comparison value calculating section 125 is the minimum. For this purpose, the block comparison value calculating section 125 may match the position of the comparison block with the block comparison value calculated at that position and temporarily store the matching pairs in a storage section (not shown).

The block comparison value calculating section 125 calculates the block comparison value of each comparison block while the comparison block is moving in the search range by pixels and thus calculates the same number of block comparison values as the number of comparison blocks selectable within the search range. When the block comparison value is the minimum, it is estimated that the corresponding comparison block is equal to or most similar to the reference block, and the block motion vector of the corresponding reference block is acquired from the difference between the position of the corresponding comparison block and the position of the reference block. For example, the block motion vector is acquired from the difference in position between the top-left pixel of the comparison block of which the block comparison value is the minimum and the top-left pixel of the block corresponding to the reference block in the previous frame. Here, the block motion vector represents an estimated motion of the reference block between two successive frames frame (t−1) and frame(t).

For example, when a background and an object can be distinguished from each other in a frame, the block selecting section 121 selects a reference block from only an area corresponding to the object, acquires a block motion vector thereof and sums or averages the values, whereby it is possible to determine a frame motion vector of the current frame relative to the previous frame. When the area corresponding to the object is selected as one reference block, the block motion vector is just the frame motion vector.

For example, when a background and an object are not distinguished from each other in a frame, the block selecting section 121 selects a reference block from all the blocks into which the current frame is divided, acquires a block motion vector thereof and sums or averages the values, whereby it may be possible to determine a frame motion vector of the current frame relative to the previous frame.

The motion ratio calculating section 129 calculates a motion ration by normalizing the magnitude of the block motion vector acquired by the motion vector acquiring section 127 or the determined frame motion vector using predetermined maximum value and minimum value.

Since it may be difficult to predict an accurate velocity of an object using only the block motion vector or the frame motion vector, the motion ratio is calculated on the basis of the ratio of the velocity to the magnitude of the motion vector determined by a user or by an statistical experiment.

The magnitude of a motion vector considered as having a high velocity is Vmax, that is, the maximum value, and the magnitude of a motion vector considered as having a low velocity (including a case with no movement) is Vmin, that is, the minimum value. The criterion of the high velocity and the low velocity may vary depending on the surveillance camera system 1 and may be determined by a user or by experimental or statistical methods.

The motion ratio Vnor of an object in the current frame is calculated by the use of Expression 2 using the maximum and minimum values.

$$Vnor=(V-Vmin)/(Vmax-Vmin) \qquad \text{Expression 2}$$

Here, Vnor represents the motion ration of an object in the current frame, V represents the magnitude of the motion vector (the block motion vector or the frame motion vector) acquired by the motion vector acquiring section 127, Vmax represents the maximum value of the magnitude of the motion vector considered as having a high velocity, and Vmin represents the minimum value of the magnitude of the motion vector considered as having a low velocity.

The video recording attribute determining unit 130 determines the video recording attribute of the camera module 10 so as to be suitable for a predetermined recording criterion using the motion information, that is, the motion ratio, acquired by the motion information acquiring unit 120. Here, the recording criterion may be statistically determined so as to distinguish an moving object in a video obtained by recording a surveillance area.

The video recording attribute to be determined may be a frame rate and/or an exposure value.

First, when the video recording attribute to be determined is the frame rate, the suitable frame rate is determined by multiplying the predetermined maximum value of the frame rate of the camera module 10 by the motion ratio, as expressed by Expression 3.

$$FPSprop=FPSmax \times Vnor \qquad \text{Expression 3}$$

Here, FPSprop represents the frame rate determined as being suitable, FPSmax represents the predetermined maximum value of the frame rate, and Vnor represents the motion ratio calculated by the motion ration calculating section 129. The value of FPSmax may be determined in advance by statistical experiments.

When the video recording attribute to be determined is the exposure value, a suitable exposure value is determined using the motion ratio, a predetermined maximum exposure value of the camera module 10, and a predetermined minimum exposure value of the camera module, as expressed by Expression 4.

$$EXPprop=(1-Vnor) \times (EXPmax-EXPmin)+EXPmin \qquad \text{Expression 4}$$

Here, EXPprop represents the exposure value determined as being suitable, Vnor represents the motion ratio calculated by the motion ration calculating section 129, EXPmax represents the predetermined maximum exposure value, EXPmin represents the predetermined minimum exposure value. The values of EXPmax and EXPmin may be determined in advance by statistical experiments.

When the video recording attribute is determined by the video recording attribute determining unit 130, the camera module controller 140 generates a camera module control signal for causing the camera module 10 to perform a photographing operation and outputs the generated camera module control signal to the camera module 10.

When the video recording attribute determined by the video recording attribute determining unit 130 is the frame rate, the camera module control signal may be a frame rate control signal. When the video recording attribute determined by the video recording attribute determining unit 130 is the exposure value, the camera module control signal may be an exposure control signal. Alternatively, when the video recording attribute determined by the video recording attribute determining unit 130 is the frame rate and the exposure value, the camera module control signal may include both the frame rate control signal and the exposure control signal.

Here, the exposure control signal may serve to control the exposure value of the camera module 10 by controlling the shutter speed and the aperture size of the camera module 10.

The camera module 10 controls the frame rate and/or the exposure value on the basis of the camera module control signal output from the camera module controller 140, whereby the video recorded thereafter has the frame rate and/or the exposure value controlled depending on the velocity of a moving object so as to distinguish the moving object. That is, by applying the low frame rate when the video includes a small motion or no motion and enhancing the frame rate only when the video includes an object moving at a high velocity, it is possible to minimize the amount of data when the video includes a small motion, thereby enhancing the efficiency of the stored data.

In general scenes, when a high frame rate and a small exposure value are maintained, the amount of data becomes greater in proportion to the frame rate and the analog gain for maintaining the brightness increases due to the small exposure value, thereby increasing the noise of the video. However, according to this embodiment, by setting a high frame rate and a small exposure value only when an object moving at a high velocity exists, it is possible to photograph the object moving at a high velocity and to maintain the efficiency of the amount of data.

Figure 6:
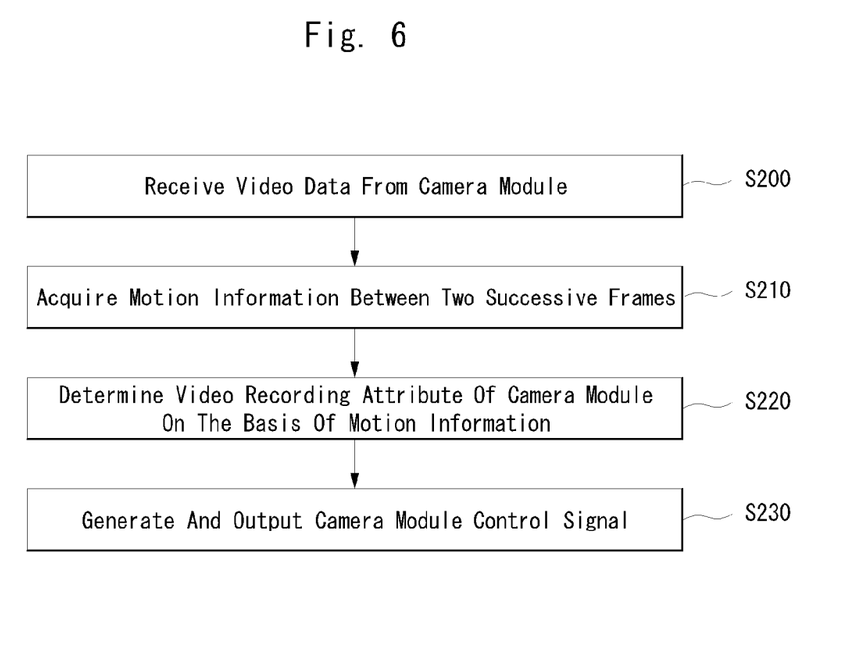
FIG. 6 is a flow diagram illustrating a video recording attribute controlling method in the video recording attribute controlling device according to the embodiment of the invention.
Figure 7:
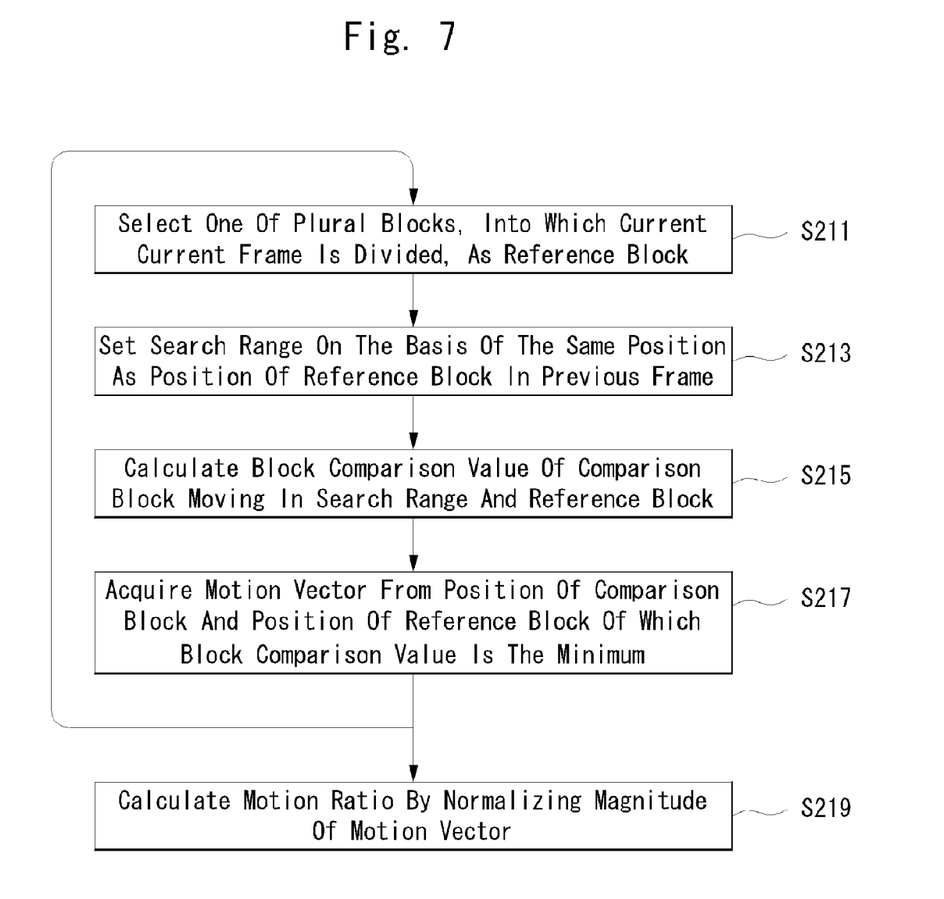
FIG. 7 is a flow diagram illustrating a procedure of acquiring motion information according to an embodiment of the invention.

FIG. 6 is a flow diagram illustrating the flow of a video recording attribute controlling method in a video recording attribute controlling device according to an embodiment of the invention. FIG. 7 is a flow diagram illustrating a procedure of acquiring motion information. The steps described below can be performed by elements of the video recording attribute controlling device.

In step S200, the video input unit 110 receives video data including plural frames from the camera module 10.

In step S210, the motion information acquiring unit 120 acquires motion information of two successive frames of the received video data.

Out of two successive frames, the prior frame is the previous frame frame(t−1) and the later frame is the current frame frame(t). In this case, the procedure of acquiring the motion information will be described with reference to FIG. 7.

Referring to FIG. 7, in step S211, one of plural blocks into which the current frame is divided so as not to overlap with each other is selected as a reference block.

In step S213, a search range based on the same position in the previous frame as the position of the reference block is set. Examples of the method of setting the search range include a method of setting the search range to an area including four blocks located on the upper, lower, left, and right sides of the reference block, four blocks located closest to the reference block in diagonal directions, and one block located at the position of the reference block and a method of setting the search range to a rectangular area including as four vertexes blocks with the same size having at the top-left corner pixels apart by a predetermined intervals from the top-left pixel of the block located at the position of the reference In step S215, the block comparison values as the comparison result of the pixel values of the comparison block in the previous frame and the pixel values of the reference block in the current frame are calculated while moving the comparison block in the search range by pixels. The calculation of the block comparison values has been described in detail above with reference to Expression 1 and thus will not be described again herein.

In step S217, the block motion vector is acquired from the position of the comparison block and the position of the reference block of which the block comparison value is the minimum.

The processes of steps S211 to S217 may be sequentially or non-sequentially repeatedly performed on all or a part of the blocks into which the current frame is divided.

When plural block motion vectors are acquired by the repetition of the processes, the block motion vectors are summed or averaged, thereby determining a frame motion vector representing the motion of the current frame relative to the previous frame.

In step S219, the magnitude of the block motion vector or the frame motion vector is normalized using predetermined maximum and minimum values, thereby calculating a motion ratio. The calculation of the motion ratio has been described in detail with reference to Expression 2 and is not described herein.

In step S220, the video recording attribute determining unit 130 determines the video recording attribute of the camera module 10 on the basis of the motion information (particularly, the motion ratio). The video recording attribute to be determined may be a frame rate and/or an exposure value. Since the procedure of determining the frame rate has been described with reference to Expression 3 and the procedure of determining the exposure value has been described with reference to Expression 4, they are not described herein.

In step S230, the camera module controller 140 generates a camera module control signal for causing the camera module 10 to record a video on the basis of the determined video recording attribute and outputs the generated camera module control signal to the camera module 10. Examples of the camera module control signal include a frame rate control signal, an exposure control signal, and a combination thereof.

The above-mentioned video recording attribute controlling method may be carried out in a time-series automated procedure by a software program built in the video recording attribute controlling device. Codes and code segments of the program will be easily obtained by programmers skilled in the art. The program can be stored in a computer-readable recording medium and can be read and executed by a computer to embody the above-mentioned method. Examples of the recording medium include a magnetic recording medium, an optical recording medium, and a carrier wave medium.

Although it has been assumed that the video recording attribute controlling device and method according to the invention are applied to a surveillance camera system, the video recording attribute controlling device and method according to the invention may be applied to a digital camera system, a mobile camera system, and the like as needed.

While the invention has been described with reference to the exemplary embodiments, it will be understood by those skilled in the art that the invention can be modified and changed in various forms without departing from the spirit and scope of the invention described in the appended claims.

What is claimed is:

1. A device for controlling a video recording attribute of a camera module, comprising:
    a video input unit that receives video data corresponding to frames from the camera module;
    a motion information acquiring unit that acquires motion information between two successive frames;
    a video recording attribute determining unit that determines the video recording attribute of the camera module on the basis of the motion information; and
    a camera module controller that generates a camera module control signal for causing the camera module to perform a video recording operation on the basis of the determined video recording attribute and outputs the camera module control signal to the camera module, wherein the motion information acquiring unit includes:
a block selecting section that selects one of a plurality of candidate blocks, into which the later frame of the two successive frames is divided so as not to overlap with each other, as a reference block;
a search range setting section that sets a search range on the basis of the position of the reference block in the previous frame;
a block comparison value calculating section that calculates a block comparison value between pixel values in a comparison block moving by pixels in the search range and pixel values in the reference block;
a motion vector acquiring section that acquires a block motion vector from the position of the comparison position and the position of the reference block, which make the block comparison value the minimum; and
a motion ratio calculating section that calculates a motion ratio by normalizing the magnitude of the block motion vector with predetermined maximum value and minimum value,
wherein the video recording attribute includes at least one of a frame rate of the camera module and an exposure value of the camera module,
wherein when the video recording attribute includes the frame rate of the camera module, the video recording attribute determining unit determines as the frame rate a value obtained by multiplying a predetermined maximum value of the frame rate by the motion ratio,
wherein when the video recording attribute includes the exposure value of the camera module, the video recording attribute determining unit determines as the exposure value EXPprop obtained by Expression, EXPprop= $(1-Vnor) \times (EXPmax-EXPmin)+EXPmin$, where Vnor represents the motion ratio, EXPmax represents the predetermined maximum value of the exposure value, and EXPmin represents the predetermined minimum value of the exposure value, and
wherein when the video recording attribute includes the frame rate and the exposure value of the camera module, the video recording attribute determining unit determines as the frame rate a value obtained by multiplying a predetermined maximum value of the frame rate by the motion ratio and determines as the exposure value EXPprop obtained by Expression, EXPprop=$(1-Vnor)\times(EXPmax-EXPmin)+EXPmin$, where Vnor represents the motion ratio, EXPmax represents the predetermined maximum value of the exposure value, and EXPmin represents the predetermined minimum value of the exposure value.

2. A method of controlling a video recording attribute of a camera module, comprising:
(a) acquiring motion information of two successive frames when video data corresponding to a plurality of frames are input from the camera module;
(b) determining a video recording attribute of the camera module on the basis of the motion information; and
(c) generating a camera module control signal for causing the camera module to perform a recording operation on the basis of the determined video recording attribute and outputting the generate camera module control signal to the camera module,
wherein the step of (a) includes:
(a1) selecting one of a plurality of candidate blocks, into which the later frame of the two successive frames is divided so as not to overlap with each other, as a reference block;
(a2) setting a search range on the basis of the position of the reference block in the previous frame;
(a3) calculating a block comparison value between pixel values in a comparison block moving by pixels in the search range and pixel values in the reference block;
(a4) acquiring a block motion vector from the position of the comparison position and the position of the reference block, which make the block comparison value the minimum; and
(a5) calculating a motion ratio by normalizing the magnitude of the block motion vector with predetermined maximum value and minimum value,
wherein the video recording attribute includes at least one of a frame rate of the camera module and an exposure value of the camera module, and
wherein when the video recording attribute includes the frame rate of the camera module, the video recording attribute determining unit determines as the frame rate a value obtained by multiplying a predetermined maximum value of the frame rate by the motion ratio,
wherein when the video recording attribute includes the exposure value of the camera module, the video recording attribute determining unit determines as the exposure value EXPprop obtained by Expression, EXPprop= $(1-Vnor)\times(EXPmax-EXPmin)+EXPmin$, where Vnor represents the motion ratio, EXPmax represents the predetermined maximum value of the exposure value, and EXPmin represents the predetermined minimum value of the exposure value, and
wherein when the video recording attribute includes the frame rate and the exposure value of the camera module, the video recording attribute determining unit determines as the frame rate a value obtained by multiplying a predetermined maximum value of the frame rate by the motion ratio and determines as the exposure value EXPprop obtained by Expression, EXPprop=$(1-Vnor)\times(EXPmax-EXPmin)+EXPmin$, where Vnor represents the motion ratio, EXPmax represents the predetermined maximum value of the exposure value, and EXPmin represents the predetermined minimum value of the exposure value.

3. A non-transitory recording medium having recorded thereon a program which can be read by a digital processor and in which command words executable by the digital processor are materially described so as to carry out a method of controlling a video recording attribute of a camera module in a video recording attribute controlling device, the method comprising:
acquiring motion information of two successive frames when video data corresponding to a plurality of frames are input from the camera module;
determining a video recording attribute of the camera module on the basis of the motion information;
generating a camera module control signal for causing the camera module to perform a recording operation on the basis of the determined video recording attribute and outputting the generate camera module control signal to the camera module,
wherein the acquiring of the motion information includes:
selecting one of a plurality of candidate blocks, into which the later frame of the two successive frames is divided so as not to overlap with each other, as a reference block;
setting a search range on the basis of the position of the reference block in the previous frame;
calculating a block comparison value between pixel values in a comparison block moving by pixels in the search range and pixel values in the reference block;

acquiring a block motion vector from the position of the comparison position and the position of the reference block, which make the block comparison value the minimum; and calculating a motion ratio by normalizing the magnitude of the block motion vector with predetermined maximum value and minimum value, wherein the video recording attribute includes at least one of a frame rate of the camera module and an exposure value of the camera module, and wherein when the video recording attribute includes the frame rate of the camera module, the video recording attribute determining unit determines as the frame rate a value obtained by multiplying a predetermined maximum value of the frame rate by the motion ratio, wherein when the video recording attribute includes the exposure value of the camera module, the video recording attribute determining unit determines as the exposure value EXPprop obtained by Expression, EXPprop=(1−Vnor)×(EXPmax−EXPmin)+EXPmin, where Vnor represents the motion ratio, EXPmax represents the predetermined maximum value of the exposure value, and EXPmin represents the predetermined minimum value of the exposure value, and wherein when the video recording attribute includes the frame rate and the exposure value of the camera module, the video recording attribute determining unit determines as the frame rate a value obtained by multiplying a predetermined maximum value of the frame rate by the motion ratio and determines as the exposure value EXPprop obtained by Expression, EXPprop=(1−Vnor)×(EXPmax−EXPmin)+EXPmin, where Vnor represents the motion ratio, EXPmax represents the predetermined maximum value of the exposure value, and EXPmin represents the predetermined minimum value of the exposure value.

* * * * *